(12) United States Patent
Topolnitsky

(10) Patent No.: US 6,936,132 B2
(45) Date of Patent: Aug. 30, 2005

(54) PATCH PLUG

(75) Inventor: Mike Topolnitsky, Winnipeg (CA)

(73) Assignee: Manitoba Ltd., Winnipeg (CA)

( * ) Notice: Subject to any disclaimer, the term of this patent is extended or adjusted under 35 U.S.C. 154(b) by 181 days.

(21) Appl. No.: 10/108,449

(22) Filed: Mar. 29, 2002

(65) Prior Publication Data
US 2003/0183321 A1 Oct. 2, 2003

(51) Int. Cl.⁷ ................................................ B29C 73/06
(52) U.S. Cl. ..................... 156/293; 152/370; 156/97
(58) Field of Search ................. 156/97, 293; 152/367, 152/370; 264/36.14

(56) References Cited

U.S. PATENT DOCUMENTS

| | | | |
|---|---|---|---|
| 733,014 A | 7/1903 | Cox, Jr. | |
| 1,897,028 A | * 2/1933 | Anderson | 81/15.7 |
| 2,852,058 A | * 9/1958 | Chambers et al. | 152/367 |
| 3,009,846 A | * 11/1961 | Wilhelm | 428/78 |
| 3,615,985 A | 10/1971 | Reick et al. | |
| 3,648,750 A | * 3/1972 | Felden | 152/370 |
| 3,773,097 A | 11/1973 | Mullins | |
| 3,842,886 A | * 10/1974 | Felden | 152/370 |
| 3,996,085 A | 12/1976 | Barnes et al. | |
| 4,375,231 A | 3/1983 | Bubik et al. | |
| 4,540,035 A | 9/1985 | Roberts | |
| 4,548,102 A | * 10/1985 | DiRocco et al. | 81/15.7 |
| 4,763,546 A | 8/1988 | Yeh et al. | |
| 5,139,840 A | 8/1992 | Ferrara | |
| 5,746,851 A | * 5/1998 | Smith | 152/370 |

OTHER PUBLICATIONS

Product sold under trade name TrueFLex owned by Tech International (1 page).
Product owned by Remaco Inc. (1 page).

* cited by examiner

*Primary Examiner*—Geoffrey L. Knable
(74) *Attorney, Agent, or Firm*—Ryan W. Dupuis; Adrian D. Battison; Michael R. Williams

(57) ABSTRACT

A patch plug is provided that has a coating continuous over both the patch and plug portions, providing a strong and continuous seal to prevent seal failure and water and air introduction. The patch and plug portions may be formed separately, each with a coating element, and fused together in a press which bonds the coatings of the patch and plug portions together to form a single, continuous coating. Means known in the art, for example rubber cement, can also be employed to further ensure a firm seal between the patch plug and the tire. Methods of manufacturing and using the patch plug are also taught herein.

4 Claims, 3 Drawing Sheets

PATCH PLUG

FIELD OF THE INVENTION

The present invention relates to repair patches for tubeless rubber tires, and more particularly to combination patch plugs that both patch the tire surface and plug the hole.

BACKGROUND OF THE INVENTION

The need for effective means for repairing tubeless tires, primarily for automobiles, is well known in the art, and various attempts have been made to introduce improved repair means. For example, Bubik et al. U.S. Pat. No. 4,375,231 discloses a tire repair construction and method wherein a patch is placed on the inner surface of the tire against the hole and partially forced through the hole, the remaining unfilled hole then filled with a plug from the outside of the tire, eliminating bulging at the repair site. Roberts U.S. Pat. No. 4,540,035 teaches a tire repair patch, possibly for use with a plug, with a unique seal portion reducing stress on the patch and improving its effective life. Tools and methods for repairing tire damage, such as can be found in Yeh et al. U.S. Pat. No. 4,763,546, are also well known.

Patch plugs are a combination of a patch and a plug, the two parts generally bonded together in some fashion, the patch covering the tire surface and the plug filling the hole. Patch plugs are also known in the art. In Barnes et al U.S. Pat. No. 3,996,085, a patch plug is taught having a linearly extending stem along the long axis of the patch, in a form addressed specifically to tires whose inner surface is inaccessible. Ferrara U.S. Pat. No. 5,139,840 discloses a trapezoidally shaped patch plug for use with radial-ply tire sidewall patching.

However, none of the prior art addresses a particularly acute problem in the field, that of providing a strong and lasting seal between the tire and the patch plug. While the patch portion covers the damaged area and the plug portion often fills the hole, the standard patch plug does not necessarily provide a strong seal to prevent patch plug failure. Commercially available patch plugs fill the hole in the tire, but they do not provide a strong seal around the plug to, for example, prevent water introduction and the resultant rust damage to steel belts in the tire. It is common to find a patch plug weakly bonded to a hole using heat curing of the rubber components, but this limited seal easily fails under normal conditions. Sometimes a manufacturer will go so far as to treat the plug portion with a coating to enable better bonding between the tire hole walls and the plug portion, but the solution has only limited effectiveness, as the coating does not provide a full coverage of the tire breach. Previous attempts to solve this problem include the wrapping of chemical gum around the plug portion prior to insertion into the hole, held in place by a cold-bonding cement, but this wrapped coating easily peels away from the plug, allowing water entry. Another attempt was the use of a spray-on coating, but this wears off under normal use conditions.

SUMMARY OF THE INVENTION

A solution is required that provides a patch plug with a coating that will ensure a strong seal, not simply filling of the hole, and not break down under normal wear conditions. According to one aspect of the present invention there is provided a patch plug for use in repairing a tire, the tire having a hole with walls, the patch plug comprising:

a first member having a generally flat surface for placement against a surface of the tire;

a second member connected to the first member at a location on the generally flat surface, the second member having a generally elongate structure, the second member for insertion within the hole in the tire, the second member having an exterior surface; and a coating to enable bonding of the patch plug to both the surface of the tire and the walls of the hole, the coating being continuous across the generally flat surface of the first member and the exterior surface of the second member.

In preferred embodiments of the present invention, the first member comprises a first heat-resistant layer, at least one coating layer, at least one rubber layer, and a second heat-resistant layer, wherein the first heat-resistant layer and the coating layer or coating layers include an aperture for communication with the second member. The first member preferably but not necessarily includes one coating layer and two rubber layers.

The present invention also includes embodiments wherein the second member has a generally cylindrical structure. The second member may also be connected to the first member at a point at or near the center of the generally flat surface of the first member, and it may also be fitted with a quill for ease of insertion within the hole. The first heat-resistant layer of the first member may be composed of foil bonded to nylon, and the coating is preferably but not necessarily a chemical gum.

According to another aspect of the present invention there is provided a method of manufacturing the patch plug described above, comprising the steps of:

(a) forming the first member as a stack of layers, the layers including a first heat-resistant layer, at least one coating layer, at least one rubber layer, and a second heat-resistant layer, wherein the first heat-resistant layer and the coating layer or coating layers include an aperture for communication with the second member;

(b) covering the second member with a coating layer;

(c) placing the second member in communication with the apertures in the first heat-resistant layer and the coating layer or coating layers of the first member;

(d) inserting the connected first and second members in a press designed to hold the first and second members in communication; and (e) subjecting the connected first and second members to heat and pressure within the press such that the coating layer or coating layers of the first member and the coating layer on the second member bond together, resulting in the coating being continuous across the generally flat surface of the first member and the exterior surface of the second member.

According to another aspect of the present invention there is provided a method of using the patch plug described above, comprising the steps of:

(a) applying a bonding agent to the surface of the coating;

(b) inserting the second member within the hole in the tire until the generally flat surface of the first member is in communication with the surface of the tire; and (c) cutting off any portion of the second member protruding through the hole in the tire past an opposite surface of the tire.

According to another aspect of the present invention there is provided a method of using the patch plug described above including a quill on the second member, comprising the steps of:

(a) applying a bonding agent to the surface of the coating;

(b) providing the second member with a quill for ease of insertion within the hole in the tire;

(c) inserting the second member within the hole in the tire until the generally flat surface of the first member is in communication with the surface of the tire;

(d) pulling the quill through the hole in the tire until the quill is pulled free of the second member; and (e) cutting off any portion of the second member protruding through the hole in the tire past an opposite surface of the tire.

Thus, in response to the problem at hand, the present invention provides a patch plug that has a coating continuous over both the patch and plug portions, providing a strong and continuous seal to prevent seal failure and water and air introduction. The patch and plug portions may be formed separately, each with a coating element, and fused together in a press which bonds the coatings of the patch and plug portions together to form a single, continuous coating. Means known in the art, for example rubber cement, can also be employed to further ensure a firm seal between the patch plug and the tire.

A detailed description of an exemplary embodiment of the present invention is given in the following, including methods of manufacture and use. It is to be understood, however, that the invention is not to be construed as limited to this embodiment.

BRIEF DESCRIPTION OF THE DRAWINGS

In the accompanying drawings, which illustrate an exemplary embodiment of the present invention.

DETAILED DESCRIPTION OF AN EXEMPLARY EMBODIMENT

Figure 1:
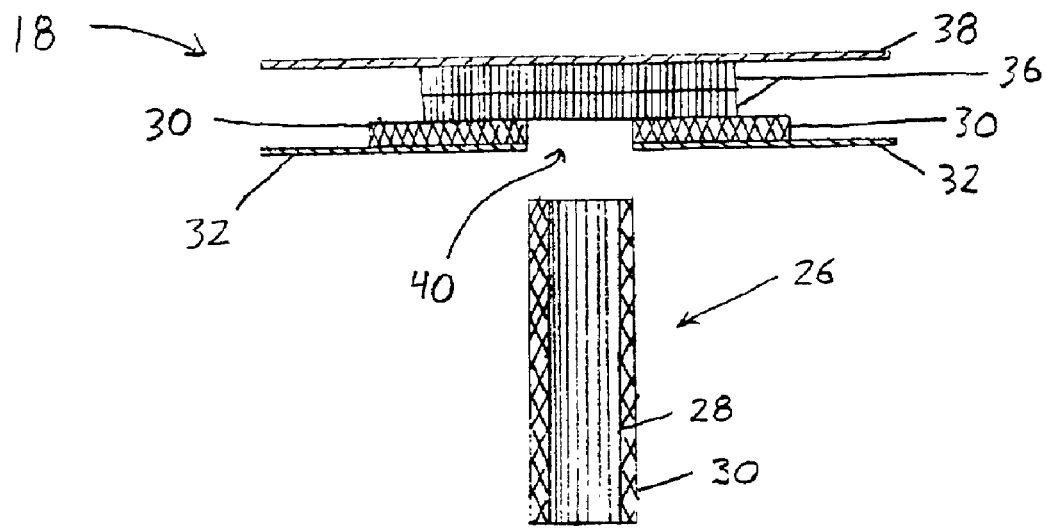
FIG. 1 is an elevational sectional view of an exemplary embodiment of the patch plug of the present invention in disassembled state along line 1-1 of FIG. 5, showing the first and second members prior to assembly.

Referring now in detail to the accompanying drawings, there is illustrated an exemplary embodiment of a patch plug generally referred to by the numeral 10, the patch plug 10 comprising a first member 18, a second member 26, and a coating 30. As can be seen most clearly in FIGS. 5 and 6, the first member 18 has a generally flat surface 20. The second member 26 has an exterior surface 28 to which the coating 30 adheres, as can be clearly seen in FIGS. 1 and 2. The coating 30 may be a chemical gum.

Figure 2:
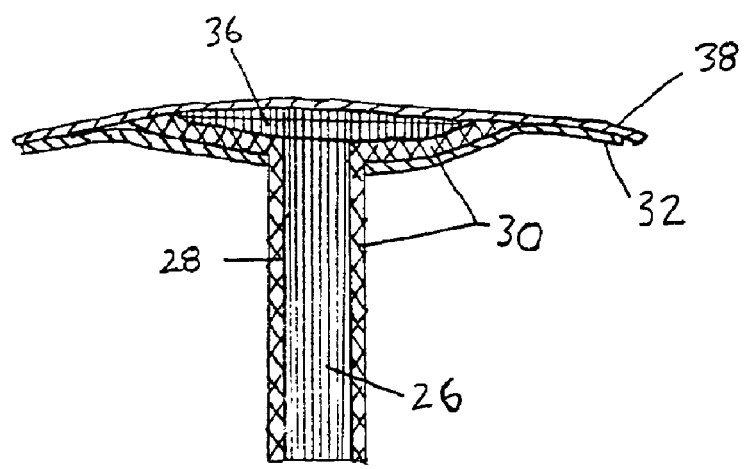
FIG. 2 is an elevational sectional view of an exemplary embodiment of the patch plug of the present invention along line 1-1 of FIG. 5, showing the first and second members as assembled.

The detailed structure of an exemplary embodiment of the present invention is illustrated in FIGS. 1 and 2. FIG. 1 illustrates the un assembled patch plug 10, while FIG. 2 illustrates the patch plug 10 after assembly in a press (not shown) as will be discussed below. The first member 18 is made up of a series of layers as follows: a first heat-resistant layer 32, which may be foil bonded to nylon; a layer of coating 30, similar in composition to the coating 30 that is on the exterior surface 28 of the second member 26, and preferably only one layer of coating 30; at least one rubber layer 36, similar to the composition of the second member 26, and preferably two rubber layers 36; and a second heat-resistant layer 38. The first heat-resistant layer 32 and the layer of coating 30 of the first member 18 each include an aperture 40, the apertures 40 lined up to allow insertion of the second member 26 during assembly of the patch plug 10.

Figure 3:
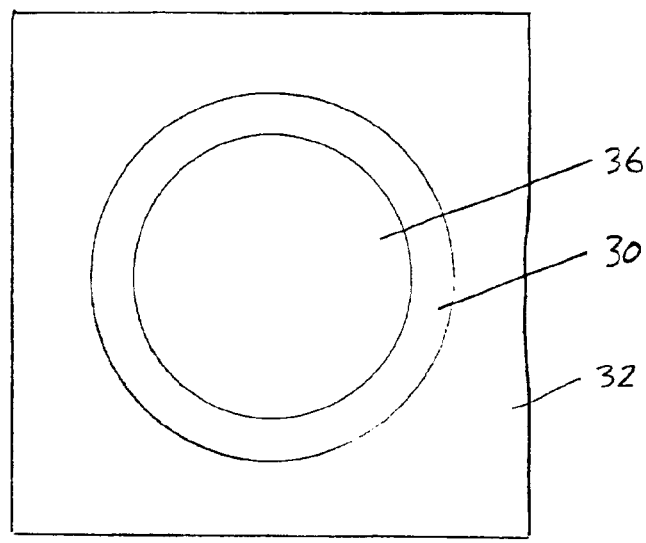
FIG. 3 is a top plan view of an exemplary embodiment of the patch plug of the present invention.

FIG. 3 illustrates a top plan view of an exemplary embodiment of the present invention after the assembly of the patch plug 10 in a press (not shown), wherein the second heat-resistant layer 38 is made of a clear plastic, hence allowing a view of the first heat-resistant layer 32, the layer of coating 30, and the rubber layer 36. As the second heat-resistant layer 38 is made of a clear plastic and cannot be differentiated in this view, it has not been numbered, but it is clearly shown in FIGS. 1 and 2 in elevational view.

Figure 5:
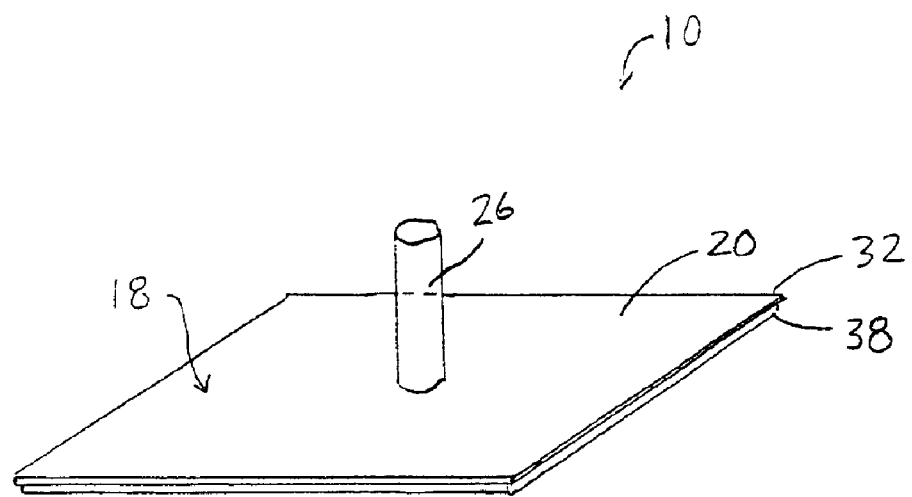
FIG. 5 is a perspective view of an exemplary embodiment of the patch plug of the present invention.
Figure 6:
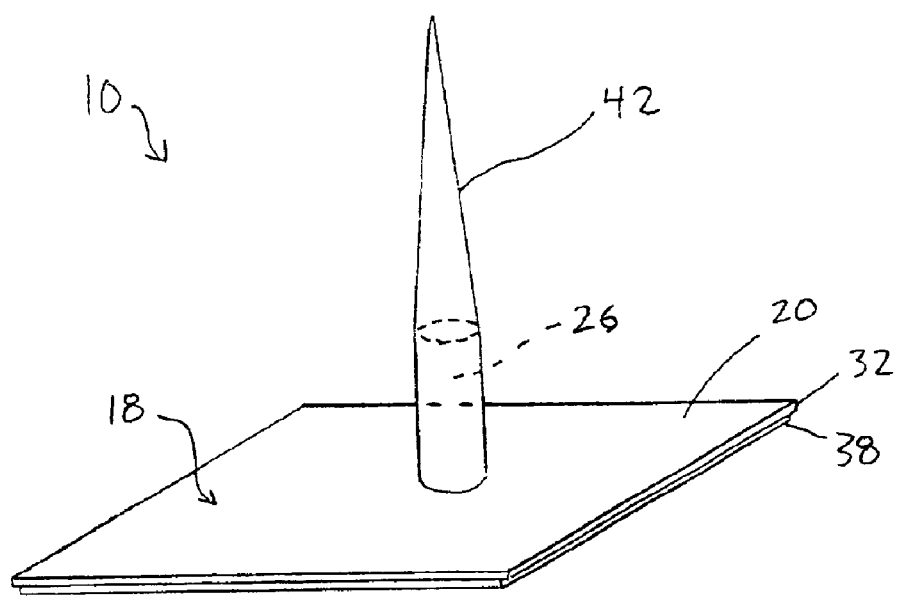
FIG. 6 is a perspective view of an exemplary embodiment of the patch plug of the present invention, including a quill.

FIGS. 5 and 6 illustrate exemplary embodiments of the present invention in perspective view, resting with the second member 26 directed upwardly. In FIG. 5, the second member 26 is shown in a generally cylindrical form without a quill 42, while FIG. 6 illustrates the second member 26 fitted with a quill 42. In FIGS. 5 and 6, the second member 26 is shown attached to the first member 18 at or near the center of the generally flat surface 20 of the first member 18.

The present invention also includes a method of manufacturing the patch plug 10 comprising the following steps. First, the first member 18 is formed as a stack of layers, the layers including a first heat-resistant layer 32, at least one layer of coating 30, at least one rubber layer 36, and a second heat-resistant layer 38, wherein the first heat-resistant layer 32 and the layer or layers of coating 30 include an aperture 40 for communication with the second member 26. Second, the second member 26 is covered with coating 30. The first and second steps can be reversed, so long as both are completed before the third step. Third, the second member 26 is placed in communication with the apertures 40 in the first heat-resistant layer 32 and the layer or layers of coating 30 of the first member 18, such that the coating 30 of the first and second members 18, 26 is in communication. Fourth, the first and second members 18, 26 as attached are inserted in a press (not shown) designed to hold the first and second members 18, 26 in communication. Finally, the first and second members 18, 26 are subjected to heat and pressure within the press (not shown) such that the layer or layers of coating 30 of the first member 18 and the coating 30 on the second member 26 bond together, resulting in the coating 30 being continuous across the generally flat surface 20 of the first member 18 and the exterior surface 28 of the second member 26. The coating 30 is also heat-moulded to the exterior surface 28 of the second member 26 during this step, forming a tight bond, and the rubber layer or layers 36 of the first member 18 form a bond with the second member 26 by heat-curing.

Figure 4:
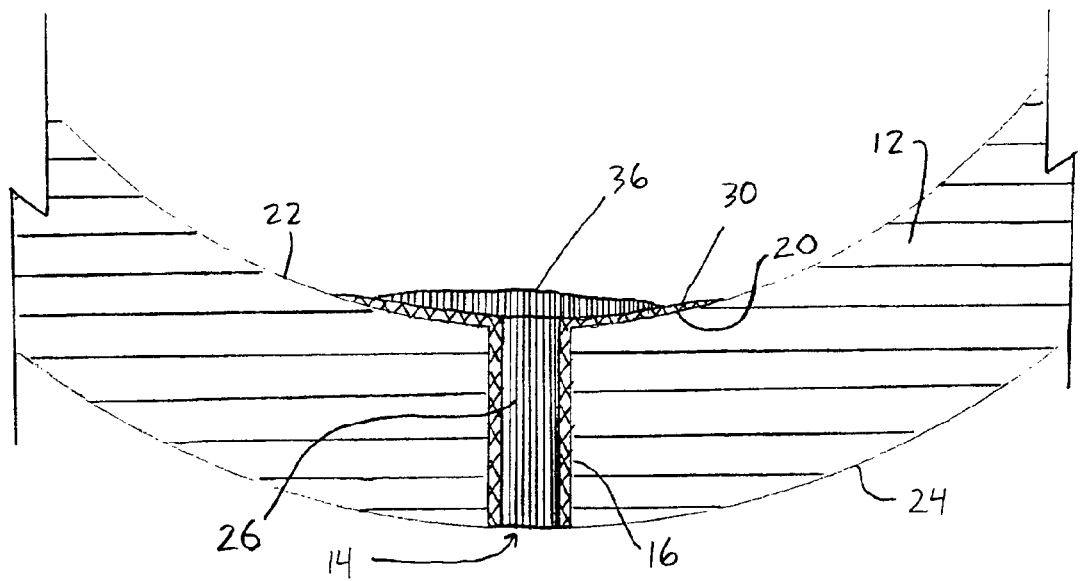
FIG. 4 is an elevational sectional view of an exemplary embodiment of the patch plug of the present invention, shown sealing a damaged tire.

The present invention also includes a method of using the patch plug 10 comprising the following steps. Reference is made particularly to FIG. 4, which illustrates a patch plug 10 inserted within a hole 14 of a tire 12. First, a patch plug 10 is manufactured using the method described above. Second, a bonding agent (not shown), such as a rubber cement, is applied to the surface of the coating 30, to further ensure strong bonding between the coating 30 and the walls 16 of the hole 14. Third, the second member 26 is inserted within the hole 14 in the tire 12 from the inner tire surface 22 until the generally flat surface 20 of the first member 18 is in communication with the inner tire surface 22. Finally, any portion of the second member 26 protruding through the hole 14 in the tire 12 past the outer tire surface 24 is cut off, resulting in a generally flush meeting of the second member 26 and the outer tire surface 24.

The present invention also includes a method of using the patch plug 10 wherein the second member 26 is fitted with a quill 42. In this method, the first and second steps of the above method are still employed. In the third step, however, the second member 26 is fitted with a quill 42 for ease of insertion within the hole 14 in the tire 12. The first and second heat-resistant layers 32, 38 are removed from the first member 18 prior to insertion of the patch plug 10, by simply peeling them off. The second member 26 with quill 42 is then inserted within the hole 14 in the tire 12 until the generally flat surface 20 of the first member 18 is in communication with the inner tire surface 22. Next, the quill 42 is pulled through the hole 14 in the tire 12 until the quill 42 is pulled free of the second member 26. Finally, any portion of the second member 26 protruding through the hole 14 in the tire 12 past the outer tire surface 24 is cut off, resulting in a generally flush meeting of the second member 26 and the outer tire surface 24.

While a particular embodiment of the present invention has been described in the foregoing, it is to be understood that other embodiments are possible within the scope of the invention and are intended to be included herein. It will be clear to any person skilled in the art that modifications of and adjustments to this invention, not shown, are possible without departing from the spirit of the invention as demonstrated through the exemplary embodiment. The invention is therefore to be considered limited solely by the scope of the appended claims.

Embodiments of the invention in which an exclusive property or privilege is claimed are defined as follows:

1. A method of manufacturing a patch plug for use in repairing a tire, the tire having a hole with walls, the patch plug comprising:
   a patch member having a generally flat surface for placement against a surface of the tire;
   a plug member connected to the patch member at a location on the generally flat surface, the plug member and the patch member being of unitary cured structure, the plug member having a generally elongate structure for Insertion within the hole in the tire, the plug member having an exterior surface; and
   a chemical gum coating to enable bonding of the patch plug to both the surface of the tire and the walls of the hole using a rubber cement, the coating being continuous across the generally flat surface of the patch member and the exterior surface of the plug member;
   the method comprising the steps of:
   (a) forming the patch member as a stack of layers, the layers Including at least one chemical gum coating layer and at least one rubber layer wherein said at least one chemical gum coating layer includes an aperture within which the plug member is positioned for communication with the at least one rubber layer;
   (b) forming the plug member as an elongate rubber member with a chemical gum coating layer about the rubber member such that the rubber member and patch member may be subsequently held in communication.
   (c) placing the plug member within the aperture in the coating layer or coating layers of the patch member such that the plug member contacts the at least one rubber layer of the patch member and the coating layer of the plug member contacts said at least one coating layer of the patch member;
   (d) subjecting the patch and plug members then in contact to heat and pressure such that the coating layer or coating layers of the patch member and the coating layer on the plug member bond together, while the plug member and patch member form a unitary cured structure, resulting in the chemical gum coating being continuous across the generally flat surface of the patch member and the exterior surface of the plug member.

2. The method according to claim 1 wherein the heat and pressure are applied using a mold designed to receive the patch member and plug member and hold them in communication.

3. The method according to claim 2, wherein the patch plug further comprises a first heat resistant layer and a second heat resistant layer with the at least one chemical gum coating layer and the at least one rubber layer positioned therebetween, the first and second heat-resistant layers being applied to ensure that the patch plug does not stick to the mold after the patch end plug members have been subjected to heat and pressure.

4. A method of manufacturing a patch plug for use in repairing a tire, the tire having a hole with walls, the patch plug comprising;
   a patch member having a generally flat surface for placement against a surface of the tire;
   a plug member connected to the patch member at a location on the generally flat surface, the plug member and the patch member being of unitary cured structure, the plug member having a generally elongate structure for insertion within the hole in the tire, the plug member having an exterior surface; and
   a chemical gum coating to enable bonding of the patch plug to both the surface of the tire and the walls of the hole using a rubber cement, the coating being continuous across the generally flat surface of the patch member and tile exterior surface of the plug member;
   the method comprising the steps of:
   (a) forming the patch member as a stack of layers, the layers including at least one chemical gum coating layer and at least one rubber layer wherein said at least one chemical gum coating layer includes an aperture within which the plug member is positioned for communication with the at least one rubber layer;
   (b) forming the plug member as an elongate rubber member with a chemical gum coating layer about the rubber member such that the rubber member and patch member may be subsequently held in communication;
   (C) placing the plug member within the aperture in the coating layer or coating layers of the patch member such that the plug member contacts the at least one rubber layer of the patch member and the coating layer of the plug member contacts said at least one coating layer of the patch member;
   (d) subjecting the patch and plug members then in contact to heat and pressure such that the coating layer or coating layers of the patch member and the coating layer on the plug member bond together, while the patch member and the plug member formed a unitary cured structure, resulting in the chemical gum coating being continuous across the generally flat surface of the patch member and the exterior surface of the plug member;
   (a) subsequently applying a rubber cement to the chemical gum coating layers of the patch member and the plug member prior to insertion Into the hole in the tire.

* * * * *